United States Patent [19]

Follendore, III

[11] Patent Number: 5,369,707

[45] Date of Patent: Nov. 29, 1994

[54] SECURE NETWORK METHOD AND APPARATUS

[75] Inventor: Roy D. Follendore, III, Manassas, Va.

[73] Assignee: TECSEC Incorporated, Vienna, Va.

[21] Appl. No.: 9,741

[22] Filed: Jan. 27, 1993

[51] Int. Cl.$^5$ .............................................. H04L 9/00
[52] U.S. Cl. ......................................... 380/25; 380/28
[58] Field of Search ...................... 380/23, 25, 28, 30

[56] References Cited

U.S. PATENT DOCUMENTS

| | | | |
|---|---|---|---|
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,864,616 | 9/1989 | Pond et al. | 380/25 |
| 4,955,082 | 9/1990 | Hattori et al. | 455/33 |
| 4,984,272 | 1/1991 | McIlroy et al. | 380/25 |
| 5,040,210 | 8/1991 | Anderson | 380/23 |
| 5,052,040 | 9/1991 | Preston et al. | 380/25 |
| 5,204,961 | 4/1993 | Barlow | 380/25 |
| 5,231,666 | 7/1993 | Matyas | 380/25 |

OTHER PUBLICATIONS

Massey, "An Introduction to Contemporary Cryptology", *Proceedings of the IEEE,* May 1988, pp. 533-549.

Schneier, "Untangling Public-Key Cryptography", *Dr. Dobbs's Journal,* May 1992, pp. 16-28.

Primary Examiner—Salvatore Cangialosi
Attorney, Agent, or Firm—Jon L. Roberts; Thomas M. Champagne

[57] ABSTRACT

A method and apparatus for ensuring the security of messages communicated on a network. The system employs different levels of security to ensure that communication integrity is not breached. A user must first enter a valid password to clear the access control subsystem. The sending user must also possess valid cryptographic information and belong to a particular organization and/or be located at a particular device in order to encrypt a plain text message that is to be transmitted over the network. The device and organization information, along with receiving user information specified by the sending user, will then be grouped into a header which will be appended to the outgoing encrypted message. In order to receive a transmitted message, a receiving user must be the particular receiving user and be part of the particular group specified by the sending user, and must be attempting to receive the communication at the device specified in the message header. If these conditions are satisfied, cryptographic information must be entered into the system in order to decrypt the message, resulting in the original plain text message.

28 Claims, 11 Drawing Sheets

| EDITION | BINARY |
|---|---|
| A | 10111011 |
| B | 00111110 |
| C | 01011011 |

```
WORK:   AB              BC              AC
     A  10111011     B  00111110     A  10111011
     B  00111110     C  01011011     C  01011011
        10000101        01100101        11100000

AB   BC
     AB  10000101
     BC  01100101
         11100000
```

| SCRAMBLED | BINARY |
|---|---|
| S AB | 10000101 |
| S BC | 01100101 |
| S AC | 11100000 |

```
WORK:    SAB C               SBC A
     SAB  10000101     SBC  01100101
       C  01011011       A  10111011
   SAB C  11011110   SBC A  11011110

SAC  11100000          11100000
       B  00111110          11100000
   SAC B  11011110          00000000
```

SABC (MASK)

```
SAB SBC   10000101          AC = SAB SBC
SAB SBC   01100101
SABC      11100000  (MASK)
```

PROOF RESULUTS:   SBC A = SAB C = SAC B

OUT OF THREE EDITIONS THERE ARE FOUR XOR COMBINATIONS OF
OUTPUT PRODUCTS USEFUL FOR NET SHIELD HEADER/KEYS.

FIG. 8

SECURE NETWORK METHOD AND APPARATUS

BACKGROUND OF THE INVENTION

While the specter of "spies" eagerly trying to obtain the defense information of various countries is very much still present in the defense and intelligence community, an equally massive threat now exists from technological or commercial "spies" who desire to obtain commercial and technical information from competing companies. These agents use sophisticated means similar to those used by the defense and intelligence community in order to obtain commercially valuable information that reveals the plans and commercial activities of competitors thereby allowing the aggressor company to obtain a competitive advantage in the marketplace. Theft of commercially valuable information is a very real and ever present threat.

To combat this type of commercial spying, various complex systems have evolved to protect company proprietary information. These systems involve physical controls over personnel as well as over the data flowing in and out of a company. For example, most computer systems used within companies require a password to be entered before the system can be accessed. It is frequently the case that confidential or company proprietary information must be passed electronically from one location to another in order to convey that information within the company in a timely fashion. Such electronic communication is easily susceptible to interception if not protected in some other form.

Cryptographic systems have evolved to fill the needs of companies and individuals wanting to protect the proprietary commercial information of a company from competitors and those who generally should not have that information.

Encryption of data is therefore a critical requirement in denying access to confidential information from those who are not so authorized. Cryptographic "keys" are an essential part of the information encryption process. The cryptographic key, or "key" for short, is a sequence of letters, numbers, or bytes of information which are manipulated by a cryptographic algorithm to transform data from plain (readable) text to a series of unintelligible text or signals known as encrypted or cipher text. The key is then used by the receiver of the cipher text to decrypt the message back to plain text. However, for two people to communicate successfully using keys, each must use the same key, assuming that the same encryption/decryption algorithm is used on both ends of the communication.

Simple encryption of data being communicated between two points only provides one level of security, however. Encryption limits data communication to those who have the key. Anyone who has the key is privy to any communication at any location. That is, if a group of people are working on a particular project, they will all presumably share a key for decrypting information relating to the project. Some of the project group may be working in one location, while the rest of the group may be located in a distant city. If one member of the group wants to send a communication to a particular member in the other city, the key will afford him no protection because everyone in the project shares the same key. Likewise, if someone wants to communicate a message to a subset of the group, for example, only to management personnel, this key would again provide her with no extra security. In another case, someone may want to send a message that is capable of being read only at a particular computer terminal, or of being printed only at a particular printer. In these and other cases, multilevel multimedia key access, or individual keys issued to each person, would provide a solution, albeit one that is quite unwieldy, inflexible, and difficult to manage by a security officer or key administrator.

A secure method of labelling files or messages that are sent from a sending user to a receiving user over a network can provide a level of protection in addition to cryptographic protection. A file "label" for purposes of this invention means a series of letters or numbers, which may or may not be encrypted, separate from but associated with the sending of a message, which identifies the person, location, equipment, and/or organization which is permitted to receive the associated message. Using a secure labelling regimen, a network manager or user can be assured that those messages meant for a certain person, group of persons, and/or location(s) are in fact received, decrypted, and read only by the intended receiver. Thus, a sending user can specify label conditions that limit access to the transmitted message. For example, many people within a company may have the key necessary to read a data file that a sender may transmit from his computer terminal to other terminals at another site within his company. The sender may, however, wish to restrict reception to those persons present at a particular terminal. By employing a secure labelling technique in addition to encryption, the sender can be assured that people having the correct key to decrypt the message but working at different terminals will not receive or be allowed to access the communication. Access may be limited to particular people as well.

It is therefore an objective of the present invention to provide a system to insure that properly specified kinds of information in a network system flows only to designated locations and to further insure that such information is only read by those individuals who are designated to review that information.

It is a further objective of the present invention to provide a system whereby information can be protected via the Type 3 triple DES (data encryption standard) or through a Type 4 expandable digital encryption process or other cryptographic algorithms.

It is a further objective to provide a system for automated key management environments which maintains a key and associated label inventory from the time the information is created to the time the information is deleted from the system.

It is a further objective of the present invention to provide a system for a multilevel automated audit router associated with the passage of information over a computer system or network as well as to evaluate the security associated with that network or system.

SUMMARY OF THE INVENTION

The present invention, also referred to as the Net Shield, is designed to improve the security of inter- and intra- office communications and to provide cryptographic data separation for the storage of and transport of data files. This privacy protection system integrates computer security labels and existing file structures with an encryption process based on a Type 3 multiple Data Encryption Standard ("DES") or a Type 4 exportable cryptographic algorithm. "Type 3" and "Type 4" are common National Security Agency ("NSA") designations for low level government and approved commercial encryption schemes, respectively. The present invention is designed to be used with most commercial operating systems.

The present invention provides privacy and data separation protection to files using a Type 4 encryption algorithm. The Type 4 key management offers data separation capability on any disk medium with no modification to the computer.

A stand alone hardware implementation called the Net Shield NLU (Network Label Unit) provides privacy and data separation using a multiple Type 3 algorithm. The data transfer and encryption process is transparent to the communications protocols and the user application.

Cipher feedback or output block encryption modes are available in both algorithm implementations. The NLU firmware can be programmed for triple DES.

Both hardware and software implementations of the present invention are based on a logical grouping of data, called a cluster, each such grouping of data sharing a single label and crypto variable key. The cluster may operate within a physical network such as a Local Area Network (LAN), within a logical network such as E-mail, or even on a single workstation. The workstation used may be a personal computer, such as a computer based on an Intel 80386 microprocessor chip. The invention may be used successfully with such a computer running on a 20 megahertz clock, utilizing 640 kilobytes of random access memory. Although the invention is designed for initial use on a network using the type of computer described, it is contemplated for use with a wide range of computers and workstations. For example, an Intel 80387 math coprocessor and extra random access memory may be added to the above configuration in order to enhance performance. Likewise, a computer based on a faster microprocessor may be used, as may a computer based on an entirely different microprocessor, such as the Motorola family of chips. In short, the present invention is contemplated for use with any device that is adaptable for use as a computing device on a network, and the particular device used in not a limitation on the scope of the present invention. At least two of these devices are contemplated for use with the system of the present invention—one as a transmit port and one as a receive port.

Labels provide a method to ensure a designated information flow for data/files that are shared among users. A label is a character string or name which a user utilizes to associate a crypto key with a particular project or compartment. Labels are uniquely mapped to the encryption process, and a label's field may be expanded to cryptographically reflect organizational functions such as location and user.

In an operational context, a user is associated with a project for which a directory and files are assigned. Access to files and to communications is limited through the project assignment label and a personal identification number. Thus, only persons associated with the project will have access to project files and communications; an unassociated person, such as a fellow employee who possesses the cryptographic key to the network, will not have access to communications having a project restrictive label. The label and encryption process can be used with application programs utilized by the project as well.

Within the project itself, access to particular communications may be restricted to a certain person or group of persons, again through the use of secure labels. Access to a communication may also be restricted to a particular device, such as a workstation terminal or printer. In this case, the label will ensure that only users present at the designated device (or group of devices) will receive the communication.

A label manager is available to complement network management. The label manager is a software package that allows the system administrator to implement company access control policies with a simple access list.

A key generator is available for creating Type 4 keys for the NLS Export/F. The NLU can be modified to generate Type 3 multiple DES keys.

DETAILED DESCRIPTION OF THE PREFERRED EMBODIMENT

The Net Shield securely encrypts, decrypts and manages keys and files, as well as archiving information files on disks, thus creating a secure network. The present invention will allow security networks that don't presently have security systems to implement such systems. Net Shield will work at application and presentation levels on the OSI model without interfering with those models and will work with word processing packages such as Microsoft Word TM for Windows.

The present invention security system will be simple to use. A user will merely supply the subject matter or group affiliation of the communication, a designated target device or group of devices to receive the communication, and a list of persons authorized to access the communication.

Figure 1:
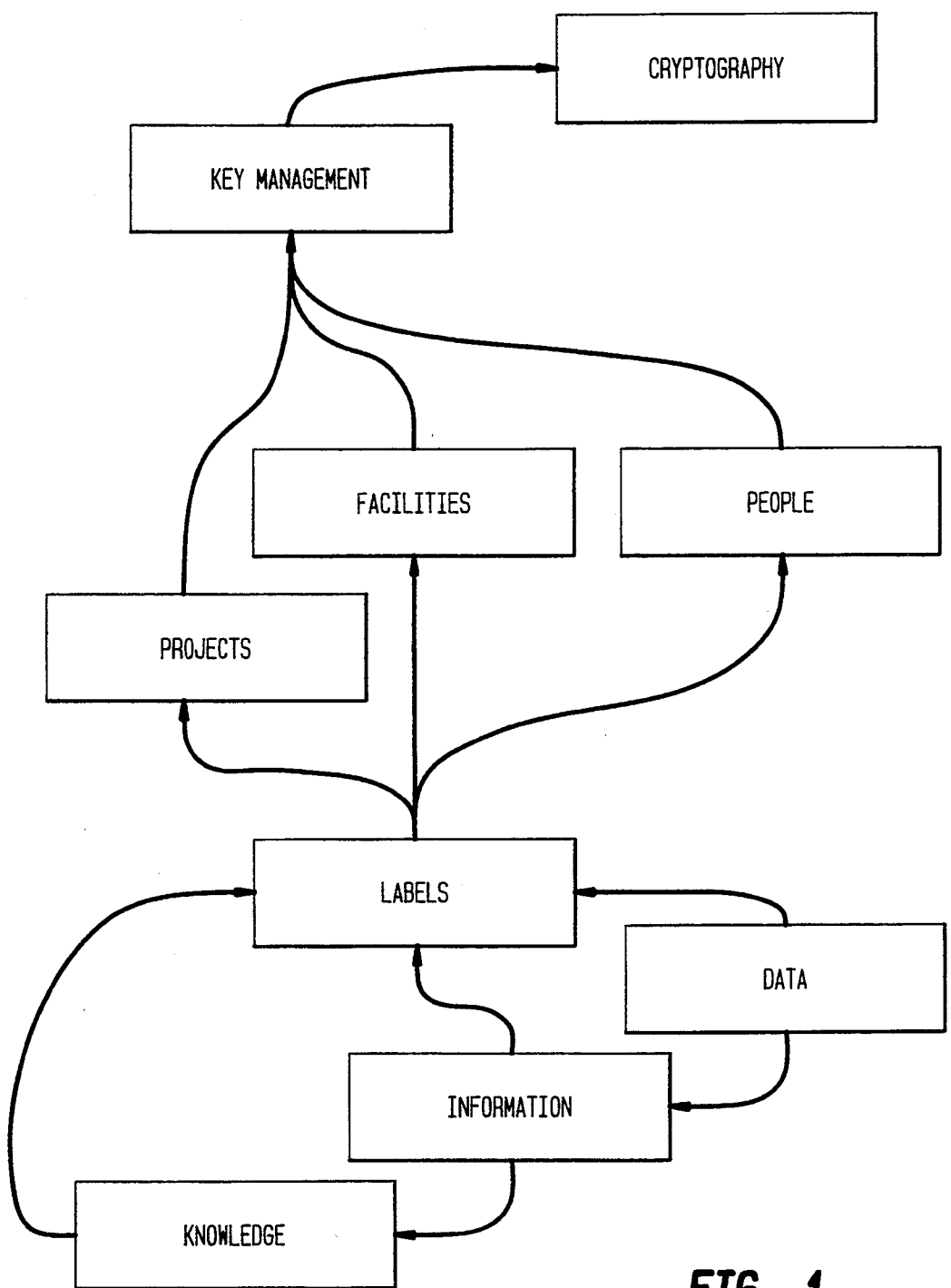
FIG. 1 Protection of a network schema
FIG. 2 Net Shield label combinations
FIG. 3 Net Shield flow chart
FIG. 4 Net Shield operational flowchart
FIG. 5 Net Shield security access system
FIG. 6 Cryptographic label system (encryption motion)
FIG. 7 Cryptographic label system (decryption motion)
FIG. 8 Net Shield header/key proof
FIG. 9 Net Shield secure routing system
FIG. 10 Network label manager
FIG. 11 Secure routing system (header labeling)

Referring to FIG. 1, some general concepts of the present invention are shown. Labels consist of data, information and knowledge. Knowledge is made of specific schema of information. Information in turn is made of specific schema or structures of data. That is, input data are processed by the system to get information. The resulting information is analyzed and interpreted to attain knowledge regarding the input. Knowledge, processed information, and raw data all go into the creation of labels. The labels themselves are then named. They are names of projects, facilities and/or people, as shown in FIG. 1. This all goes into a process to perform the key management functions necessary for the cryptography.

Figure 2:
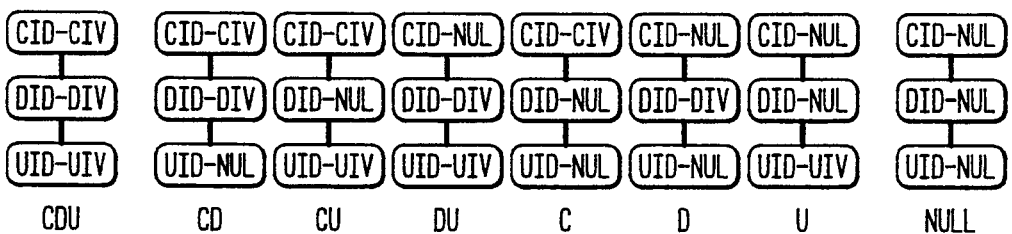

FIG. 2 shows the Net Shield truth table which is a depiction of all the possible combinations of access restrictions that can be placed on a communication, given the three levels of labels utilized by the present invention. Each Net Shield project on file will have a CID, a DID, and an UID.

"CID" stands for Cluster Identification, or Cluster I.D. It is an authorization label based on an identification of the idea that the subject or concept of the message to be transmitted involves. The CID could therefore be a label associated with a project name, or it could be a topic such as "baseball scores" or "research and development software issues." The CID is a label that will be used to restrict access to any files or communications regarding that particular project or subject matter.

"DID" stands for the Device Identification, or Device I.D. and is the authorization label based on the physical location or the logical location for a decryption to take place. It could be, for instance, the label for terminal number 29 or unit number 7, or it could identify a printer or a telemetry signalling device that must receive the information and needs to use that information for decryption purposes.

"UID" stands for Use Identification, or Use I.D. The label is based on an authorized receiving user or group of users. It could also be used to designate a particular use, such as a signal that will be used only to enable a fire alarm system, or to initiate a rocket telemetry process.

The UID, the DID, and the CID provide the uniqueness of communication relative to organizational and operational qualities for a user. When used in combination, the three labels will enable the user to choose from among a wide variety of possible confidentiality combinations.

The truth table (FIG. 2) demonstrates how the labeling of files for transmission or for later access by other users takes place. Each label will include a Cluster Initialization Variable ("CIV"), a Device Initialization Variable ("DIV"), and a Use Initialization Variable ("UIV"). The CIV is the portion of the label that will be occupied by the CID. The particular CID that fills the CIV space will identify the cluster that is being authorized for the communication. Likewise, the DIV is the portion of the label that will be occupied by the DID, which will identify the device that is authorized to receive the communication. Finally, the UIV is the portion of the label that will be occupied by the UID, which will identify the user or use that is authorized to receive the communication.

When a CID, a DID, and a UID are all named within the label, access to the communication will be limited to the particular user (or group of users) named, to be received on the particular device (or group of devices) named, regarding the particular cluster (or group of clusters) named. At times, a user transmitting the information may not need to name intended receivers with such specificity. For example, a user may want to limit the communication to a particular cluster and user, but may want to allow reception on any convenient device. In this case, a null character replaces the DID in the DIV spot. The null character in this spot simply means that device access is not restricted. Likewise, if the user transmitting the file wants to limit the communication to a particular device, regarding a particular cluster, but wishes to allow anyone at that device to access the communication, she would use a null character in place of the UID in the UIV spot. A null character may also replace the CID in the CIV spot, and any combination of the three labels may also be replaced by a null in its respective spot. Thus, a user may transmit a completely non secure labelled communication by placing null characters in the CIV, DIV, and UIV spots.

FIG. 2 shows all the different combinations of label security possible using Net Shield. Each of the eight combinations possible for a label having a CIV, a DIV, and a UIV is given a name (CDU, CD, CU, DU, C, D, U, or NULL) which identifies the type of access the label combination will bestow. For example, a CDU label combination will limit access to a particular user at a particular device regarding a particular message subject. A DU label combination, on the other hand, will allow access of any file to a particular user at a particular device. Descriptions of the access allowed by each named label combination are listed in FIG. 2.

The null character actually represents a unique number. That number is embedded within the Net Shield software so that anyone outside of the organization using the system who does not have that particular software version would not be able to decrypt the file using the null. For example, someone from an outside company that is also using the Net Shield system would not be able to access a file, even if the file had a null character in the UIV spot. The system would not recognize an outside user number as one associated with the unique null assigned to that particular software version, and would deny him access. This ensures that communications that are open to everyone within a particular company are not accessible to persons outside that company, even if the outside person possesses a valid Net Shield user number.

Figure 3:
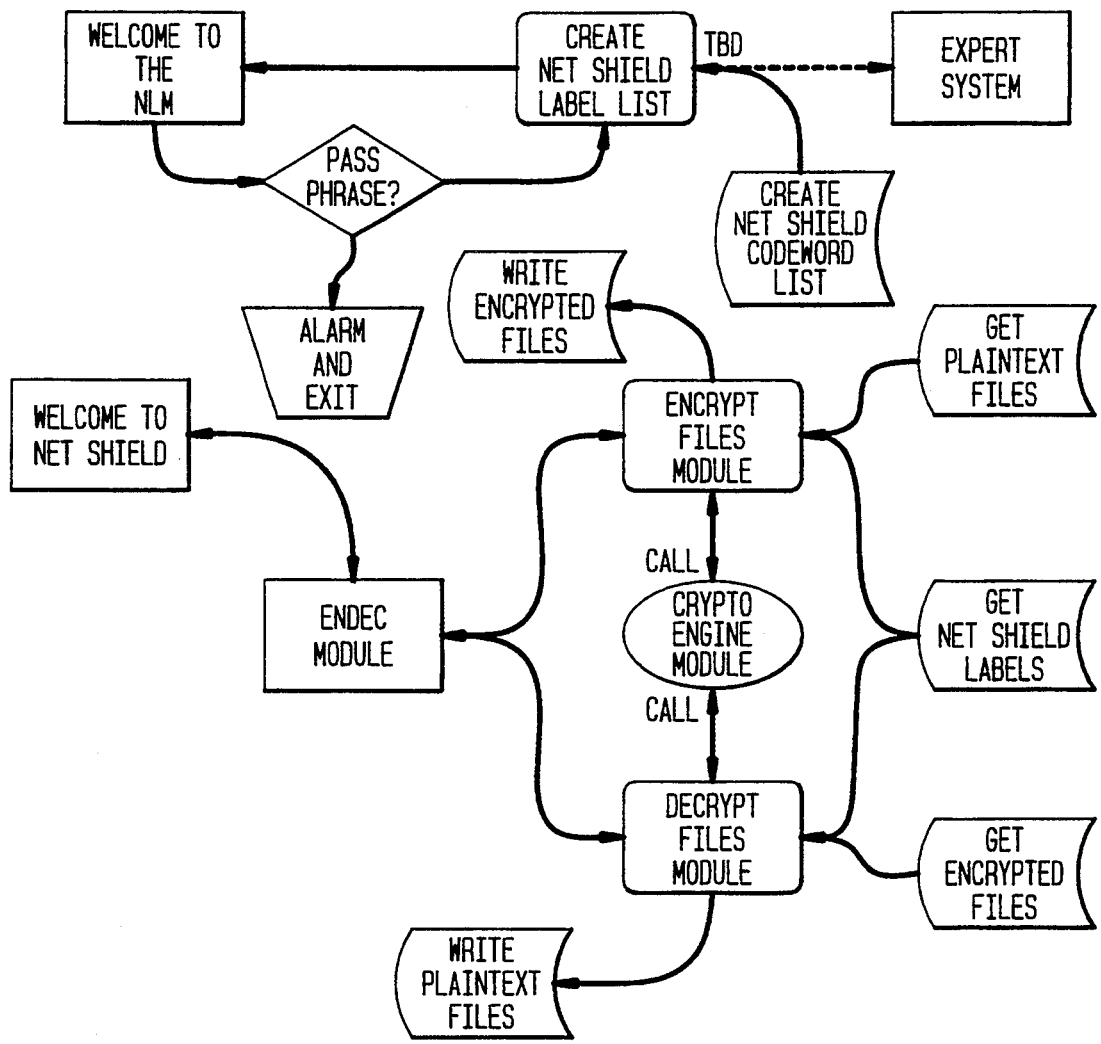

Referring to FIG. 3, the Net Shield data flow is described. The system employs a "pass phrase" system for access security. This pass phrase step must be satisfied before the actual Net Shield encryption/decryption process can be initiated. Once the pass phrase system is satisfied, a user will be able to create and generate label lists from a set of label rules using an expert system. A user will also be able to create code word lists, for use in the Net Shield header, which will be described later. If the pass phrase system is not satisfied, an alarm is generated and the user is forced to exit the system.

Assuming the pass phrase process is successful, the user then initiates the process of the present invention as he would with any software. Once the session is initiated, the encryption/decryption ("ENDEC") module is the first decision point. The ENDEC module requests that the user select between the encrypt files and decrypt files functions. If a user decides to decrypt files, and has proper Net Shield access, the system gets the encrypted file that was requested and writes the file out in plain text. The encrypted file may have been sent to the user or to the device as a secure communication, or may be resident on the entire system as a common file that is designated for limited access. The user also has the capability to get labels at this point.

If a user decides to encrypt files for transmission or storage, a similar process is followed. The user gets the plain text files instead of getting the encrypted files. If the user is in the encrypt files module, the plain text files are retrieved from memory along with the associated Net Shield label, and the encrypted file is then created. The Net Shield label is used to form a 100 byte header in a process which will be described in more detail later in the specification. The header is then appended to the front of the encrypted message before transmission or storage. Both the encrypt and decrypt processes call the same crypto engine module.

Figure 4:
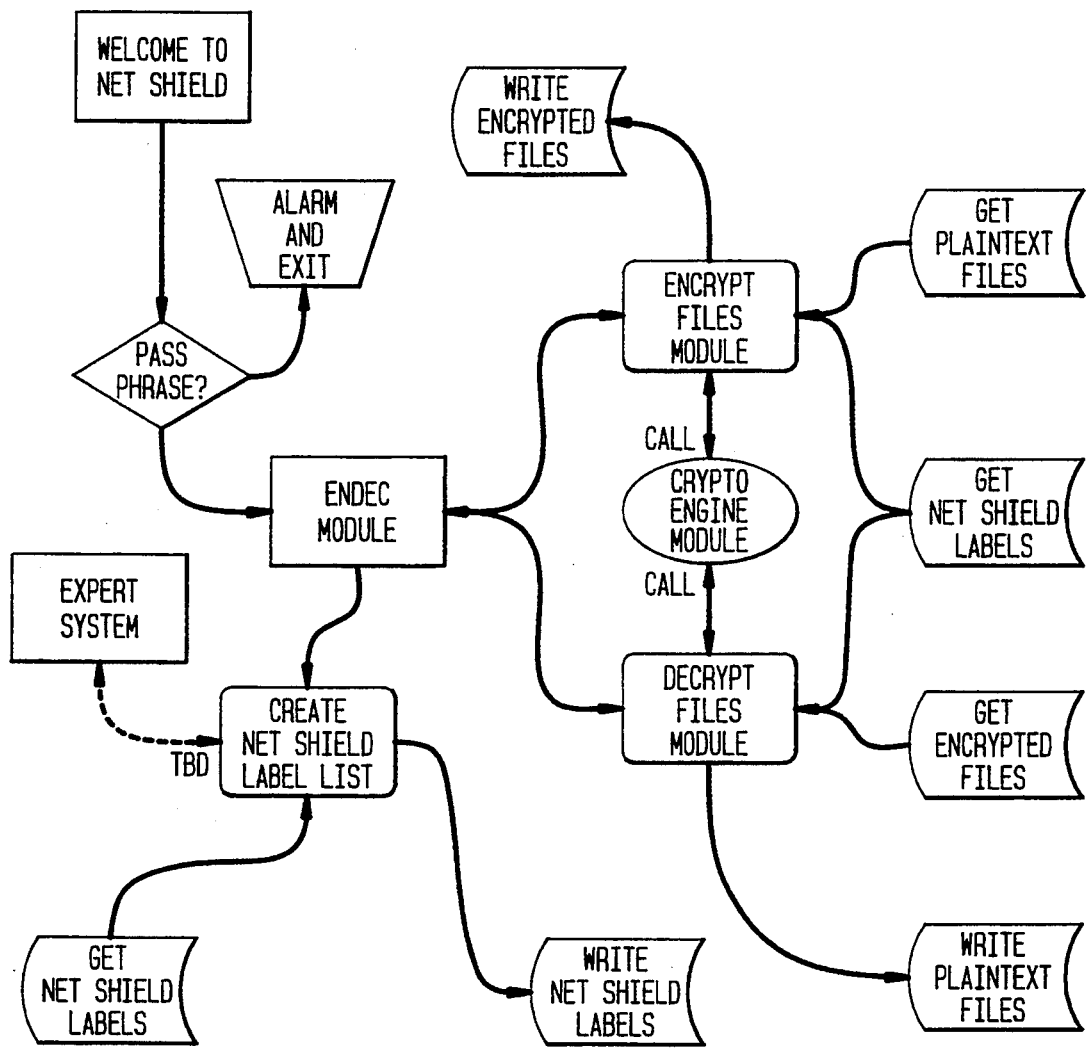

FIG. 4 shows the Net Shield system with the pass phrase and expert label creation systems integrated. The system as shown here is the operational prototype and represents the best mode version of the Net Shield system. The pass phrase system allows access to the ENDEC module. After an encryption or decryption option is chosen at this point, the user is able to create Net Shield Label lists and write out new Net Shield labels by utilizing the integrated expert system, or can get previously created Net Shield labels stored in system memory. From this point, the system functions as previously described.

Figure 5:
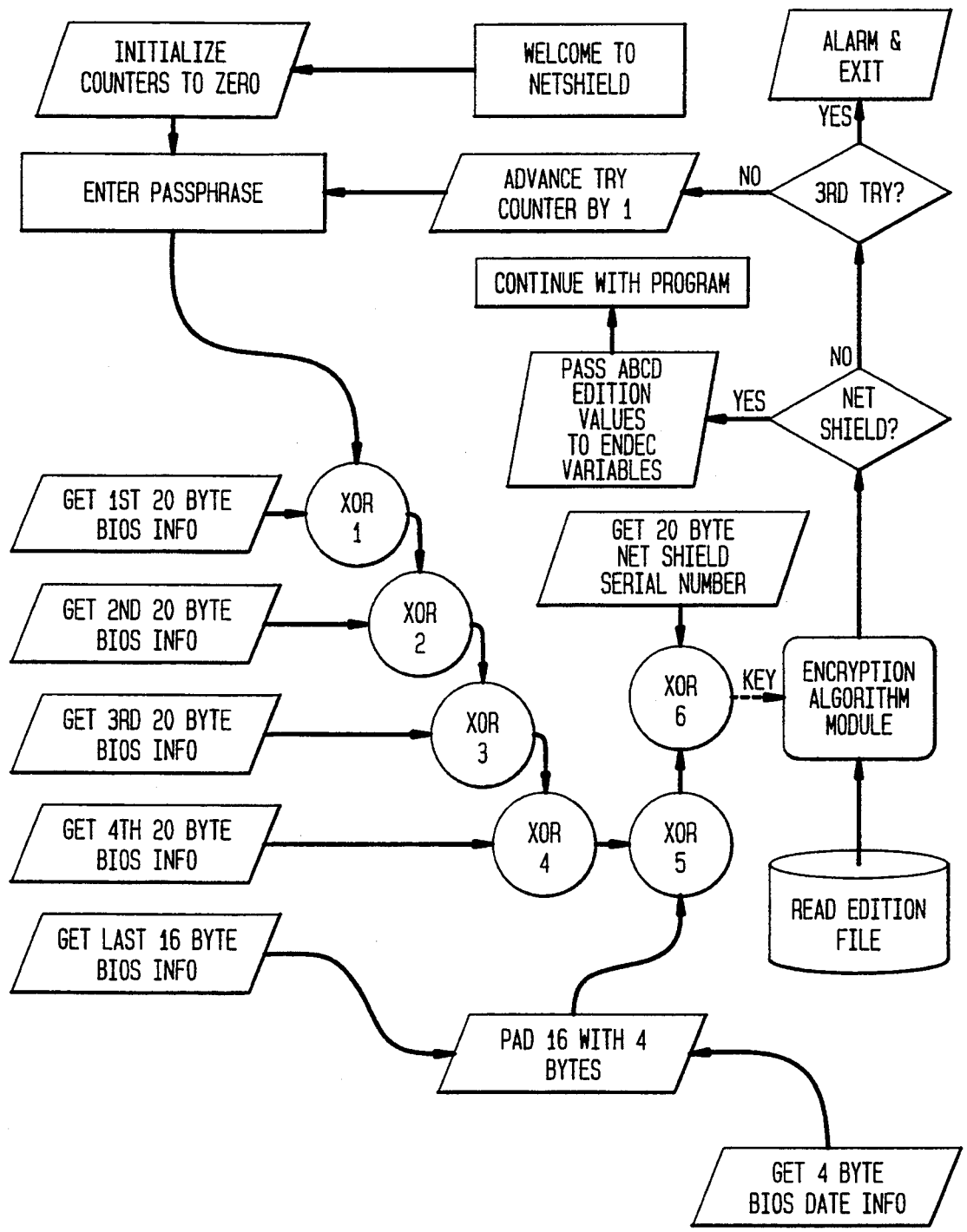

Referring to FIG. 5, the Net Shield BIOS pass phrase security access system, or SAS, is shown in detail. The program is intended to provide a means of access control for any of the applications software being used on a system. It represents the first level of security for the system, occurring before key encryption/decryption and labelling/label decoding. The system initializes all counters to zero for the first access attempt. The user then enters a pass phrase. The pass phrase consists of 20 bytes of information which is unique to the user. Each of these bytes is eight bits long and represents an alphanumeric character, with upper and lower case letters recognized by the system as distinct and separate characters. Thus, to the user, the pass phrase is literally a phrase composed of 20 alphanumeric characters. As the user enters his pass phrase, the system acquires 20 bytes of BIOS information from system memory. There is a total of 96 bytes of information in the BIOS ROM resident in the system. This BIOS information and the pass phrase are manipulated by a series of XOR gates to produce a pass key. The 96 bytes of BIOS information is changeable by a system manager in order to maintain the integrity of the system over long periods of time.

The first 20 bytes of BIOS information are obtained and XOR'ed with the user inputted pass phrase by the XOR 1 function. This XOR function is performed on a bit by bit basis, resulting in a 20 byte product. The second 20 bytes of that BIOS information are then obtained and XOR'ed, by the XOR 2 function, with the output of the XOR 1 function. This XOR process continues to the XOR 4 function, which operates on the fourth 20 bytes of BIOS information. Once this is accomplished, the last 16 bytes are obtained and are concatenated with 4 additional bytes. The 4 additional bytes are acquired from the BIOS date information. The BIOS date information is a binary representation of the date that the particular BIOS information used by the pass phrase SAS was implemented in the system. Thus, an unauthorized person who somehow acquires knowledge of the BIOS information will not be able to gain access to the system without knowledge of its date of implementation.

The concatenation of the BIOS date information with the last 16 bytes of BIOS information results in another 20 bytes of BIOS information which is XOR'ed, by the XOR 5 function, with the output of the XOR 4 function. 20 additional bytes of data are then obtained from the Net Shield serial number, which comes with the software and is resident internal to the software. The serial number is essentially a hard wired variable. That information is XOR'ed with the output of the XOR 5 function to produce the pass key for the encryption algorithm that is used by the encryption module, and an edition file is read from the disk. The edition file is encrypted through the encryption algorithm module using the key that has been generated. It is determined during this step whether the information read from that file indicates that it is truly a Net Shield file. If it is, the system passes the edition values to the ENDEC module as the program continues. If a proper Net Shield file was not generated, the system determines if this has been the third attempt at file access. If it has not, the system advances the try counter by one and the entire pass phrase process is repeated. If a third try fails, an alarm is sounded and the user is exited out of the program.

In summary, the pass phrase SAS utilizes EIOS information obtained from the hardware of the upper memory locations, the exact location depending on the particular work station used. Pass phrase information from the user is input to the pass phrase module and XOR'ed with the BIOS information. The serial number which is unique to the particular Net Shield BIOS pass phrase SAS software resident in the workstation is then XOR'ed with the result. A pass key is generated, which allows the encryption algorithm module to accept an edition file. The edition values are then passed to the ENDEC module.

When the user is in the decrypt files module rather than the encrypt files module, the process is identical except that the pass key is provided to the decryption algorithm module rather than the encryption algorithm module. The edition values will then be used by the ENDEC module to strip and interpret the Net Shield header and to provide a key to enable decryption of the associated message.

Figure 6:
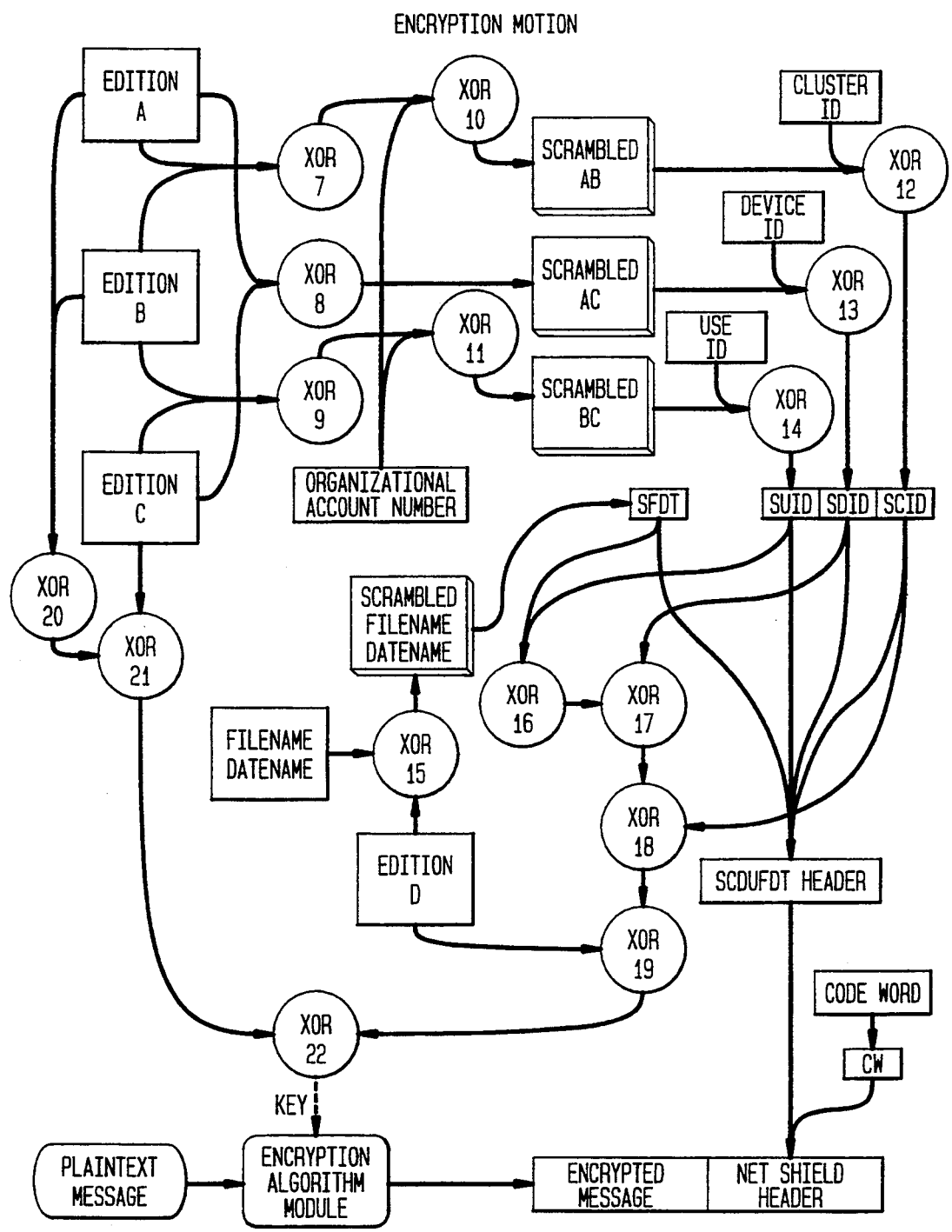

Referring to FIG. 6, the encryption methodology or "motion" of the cryptographic label system (the "CLS") is described. This motion can be initiated only after the Passphrase SAS has been satisfied, and provides encryption for the message, as well as an encrypted header for identification and labelling of the message. There are four editions of cryptographic information used in both the encryption motion and the decryption motion: Edition A, Edition B, Edition C, and Edition D. Additional editions may be added as required to extend the flexibility and/or enhance the security of the system. These editions are unique 20 byte initialization vectors that will be used to start the program. They are critical to the operation of the encryption and decryption motion. In addition, there is an organizational account number that is provided that represents a number that is unique to the user of the invention. The purpose of the organizational account number is to provide a unique null capability to the Network Label Unit, CID, DID and UID.

Edition A and Edition B are XOR'ed by XOR 7, the result of which is XOR'ed with the organizational account number by XOR 10 to produce a scrambled AB result. Edition A and Edition C are XOR'ed by XOR 8 to generate the scrambled AC result. Edition B and Edition C are XOR'ed by XOR 9 to produce a result which is XOR'ed with the organizational account number by XOR 11 to produce the scrambled BC result. Therefore, the results of these operations are a scrambled Edition AB, a scrambled Edition AC and a scrambled Edition BC. All of these scrambled editions are 20 characters in length, that is, 20 bytes in length. In fact, all editions of the present invention are at least 20 characters in length. It is possible to implement the present invention using 6 or 8 characters; however, use of this 20 character configuration provides better security.

The Cluster I.D., the Device I.D. and the Use I.D. are then provided to the inputs of XOR 12, XOR 13 and XOR 14 respectively, and are XOR'ed with scrambled Edition AB, scrambled Edition AC and scrambled Edition BC, respectively. This produces scrambled versions of the identifiers (generally noted with the letter "S" as a prefix to the identifier): the SUID, the SDID and the SCID products, respectively.

Edition D is XOR'ed with the filename date time group, which is another 20 characters, by XOR 15 to produce the scrambled filename date time ("SFDT") product. The SFDT is XOR'ed with the SUID by XOR 16. The product of this is XOR'ed by XOR 17 with the SDID. The result of the XOR 17 operation is XOR'ed with SCID by XOR 18. Edition D is then XOR'ed with this product by XOR 19.

This process creates what is called "clockwise" motion to this system. On the left side, Edition A, Edition B and Edition C are XOR'ed in the following manner. Edition A and Edition B are XOR'ed by XOR 20. This result and Edition C are XOR'ed by XOR 21. This product and the product of XOR 19 are XOR'ed by XOR 22 to produce the encrypt key. This encrypt key is used on the plain text message in the encryption module to produce the encrypted message. That is, once the key is provided to the encryption algorithm module, the algorithm is applied to the plain text message to produce the encrypted message.

The SFDT, SUID, SDID and the SCID are linked serially to form an 80 byte SCDUFDT (scrambled cluster display user filename date time) header for any given file. In addition there is a code word ("CW") which is 20 character readable text, that will also be placed on the front end of this header, for a total of 100 bytes for the Net Shield header.

The product of the encryption process, the encrypted message, is a binary file. The Net Shield header is placed at the front of the binary file. This header is not generally readable as plain text because it has been scrambled and encrypted through the previously described series of XOR operations. The only part that is plain text readable is the code word, which is used in case of accidental misrouting or "spillage" of the encrypted message. The code word allows people who don't have access to either the routing information or the encrypted message to be able to convey which message may have been misdirected or "spilled" en route in order to reroute that message and provide that message to someone who does have access and can reroute that message. That is, a person without access can identify the message using the code word, without being able to read the access information in the Net Shield header or the encrypted message binary file.

Figure 7:
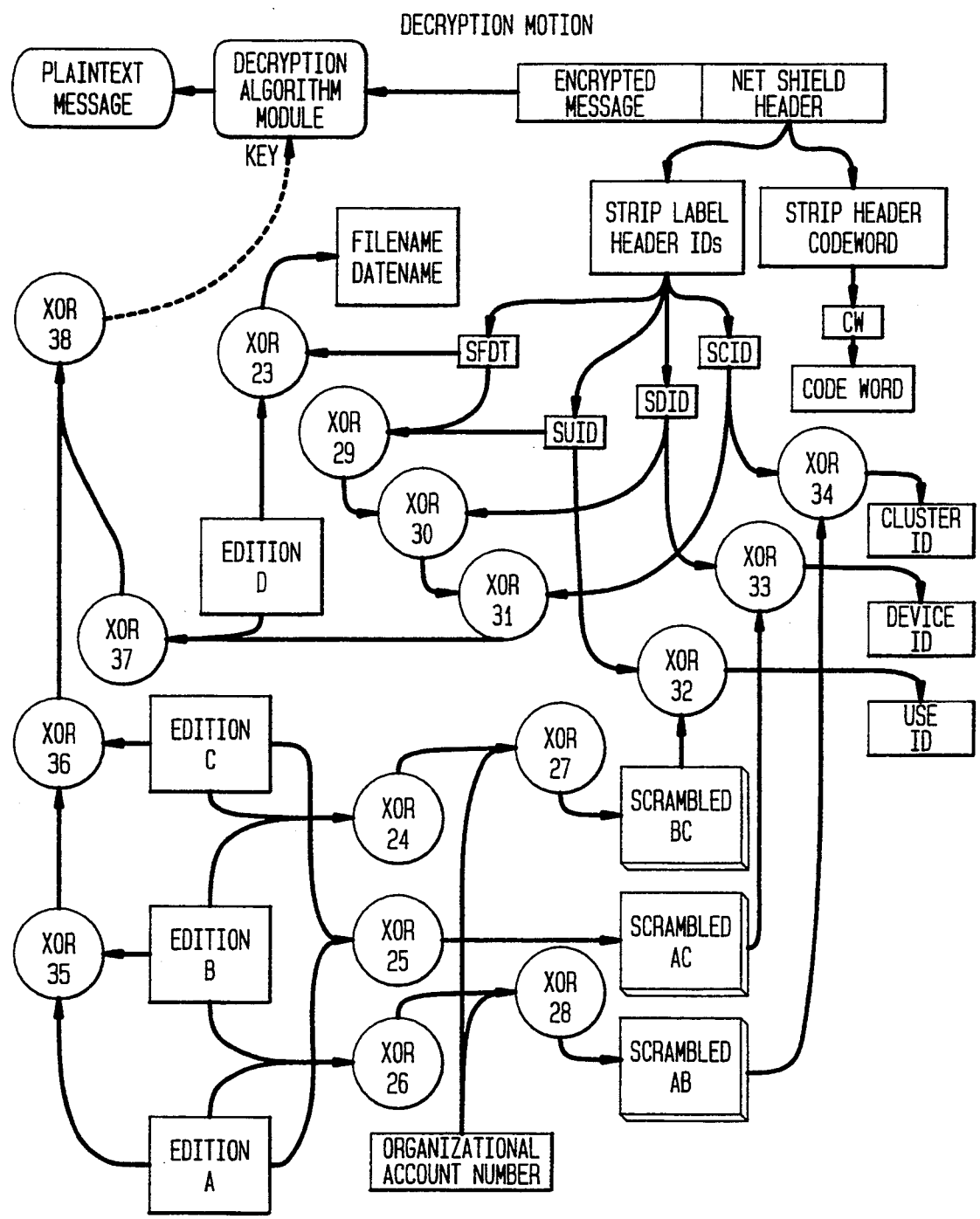

Referring to FIG. 7, the decryption motion is described. The encrypted message is received by the system and the Net Shield header is recognized and stripped away from the encrypted message by the strip label header IDs module. The 20 byte code word portion of the header is removed by the strip header code word module. This process is available to anyone who has physical access to the encrypted message (i.e. the code word can be read as plain text by anyone). As previously described, the code word is essentially meaningless in terms of the encryption process and decryption process but it provides a means of "spill control" if a particular encrypted message happens to, for example, inadvertently get written into the wrong disk or displayed at the wrong terminal. In such a case, the code word is recognized once it is stripped off the header and the file can be directed to a security officer. The security officer can interpret the code word, which will identify people who have appropriate clearance to reroute the communication. The remaining 80 bytes of the Net Shield header are then stripped away from the encrypted message and are separated into the SFDT, SUID, SDID, and SCID 20 byte components.

The same four editions of cryptographic information that were used in the encryption process are now used in the decryption process. Edition D is XOR'ed with the SFDT by XOR 23 to recover the filename date time group. Thus, the only thing a person actually needs to determine what the file name and the date time are, is Edition D and knowledge of how to strip out the SFDT. Having that information does not provide the person with the key, however, to decrypt the message. A person who has a need to know file names and date times for the different messages coming in could do so with only the Edition D. The access to read this information could therefore be granted to a person without allowing him access to the message itself by providing him with Edition D.

Edition A and Edition B are XOR'ed by XOR 26 and the result is then XOR'ed with the Organizational Account Number by XOR 28 to produce a scrambled Edition AB result. Edition C and Edition B are XOR'ed by XOR 24 and this result is XOR'ed with the Organizational Account Number by XOR 27 to produce the scrambled Edition BC result. A scrambled Edition AC result is achieved simply by XOR'ing Edition A with Edition C by XOR 25. Thus, Edition A, Edition B, and Edition C are used, along with the Organizational Account Number, to generate the scrambled editions that were used to generate the labels and the encryption key during encryption of the message. During the decryption motion, these will in turn be used to recover the unscrambled Cluster I.D., Device I.D., and Use I.D.

As previously described, the Organizational Account Number is not involved in the scrambled Edition AC process, neither during the encryption motion nor during the decryption motion. This results in a form of asymmetrical type of encryption/decryption process. This asymmetrical encryption/decryption provides added security for the system. If the Organizational Account Number were not part of the process for deriving the scrambled editions, or if it were part of the process in deriving all of the scrambled editions, an unauthorized person who is familiar with encryption systems would be able to determine the original unscrambled editions on inspection of the scrambled editions. The asymmetrical scrambling scheme using the Organizational Account Number will prevent this from happening. Attempts to decode the scrambled editions in this case will only result in a scrambled product or the Organizational Account Number itself.

After the scrambled editions are produced, the scrambled Edition BC is XOR'ed with the SUID by XOR 32 to produce the use I.D. The scrambled Edition AC is XOR'ed with the SDID by XOR 33, generating the Device I.D., and the scrambled Edition AB is XOR'ed with the SCID by XOR 34 to generate the Cluster I.D. Thus, the UID, the DID, and the CID are all recaptured from the Net Shield header on the receive side of the message transmission. The user on the receive side therefore now possesses the information essential for verifying which project the communication involves, which device is able to receive the message, and which person is authorized to read the contents of the message. Not only will the above operation enable the appropriately cleared person who is reading the header to read information regarding the intended destination of the message, it will also simplify file management tasks regarding the plain text message that will be received by the intended recipient.

The decryption key is then generated by the following process. The SFDT is XOR'ed with the SUID by XOR 29. The product of XOR 29 is then XOR'ed with the SDID by XOR 30. The product of XOR 30 is XOR'ed with the SCID by XOR 31. This product is then XOR'ed with Edition D by XOR 37. Edition A and Edition B are XOR'ed by XOR 35. The product of XOR 35 is XOR'ed with Edition C by XOR 36 and this result and the product of XOR 37 are then XOR'ed by XOR 38 to generate the decrypt key. The decrypt key is used by the decryption algorithm module to decrypt the encrypted message, resulting in a plain text message output. The decryption algorithm is applied to the encrypted message by the decryption algorithm module during this process. The decrypt key is the final element that is supplied to the decryption algorithm module that allows the module to perform the decryption.

Thus, the decoding of the header, which allows the user to read as plain text the Cluster I.D., the Device I.D. and the Use I.D., as well as the File Name Date Time, is independent of the actual key management process. Therefore, a security officer or file management personnel may be provided with the scrambled editions, imparting information to these persons regarding the routing of the communication. However, a person in possession of only the scrambled editions, and not of Editions A, B, C, and D, will not be able to generate a decrypt key and hence will not be able to decrypt the actual message. The plain text message will be inaccessible to a person having only the scrambled editions. A person with knowledge of Editions A, B, C, and D, however, will be able to decode the header and decrypt the attached message. It is also important to note that generation of the decrypt key is not possible without input from elements of the header. The SFDT, the SUID, the SDID, and the SCID must all be provided by the header in order to acquire the decrypt key.

FIG. 8 is a key proof of the XOR functions using a limited number of binary digits (bits). The purpose of this figure is to demonstrate that the editions and the scrambled results can be protected from someone who happens to have the scrambled BC, AC, and AB.

Figure 9:
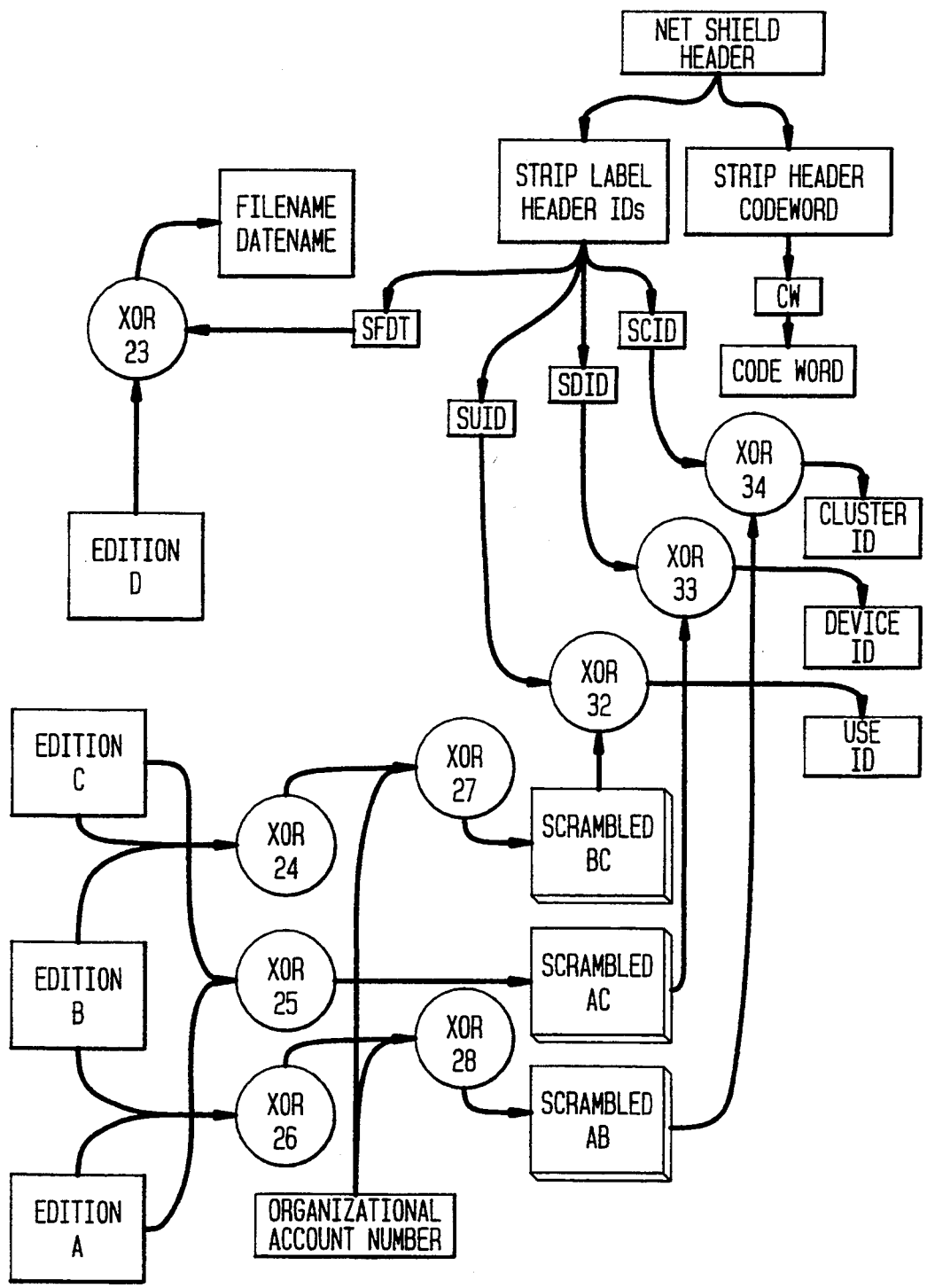

FIG. 9 isolates the secure routing function of the decryption motion in order to stress its significance. The secure routing function is one aspect of the overall encryption/decryption methodology. This function first breaks out the header into a CW, the SFDT, the SUID, the SDID, and the SCID. Once decoded, these components of the header contain all the routing and identification information regarding the message to be transmitted or stored. This information must be safeguarded from outsiders, even if the unauthorized person cannot read the actual message. Knowledge regarding the routing of communications within a company can give an outsider knowledge of the structure of the company or of organizations within the company. This information, along with knowledge of the titles and dates of the files, can impart a great deal of information to the industrial spy as to the current practices of the company. This in turn may be used by the competition for commercial advantage or to negate commercial disadvantage. Information on the routing and identification of company communications must therefore be carefully safeguarded.

On the other hand, it is important that an authorized user be able to tell the significance of a communication without having to decrypt the message. It is also important that a person who is not authorized to receive the communication but who nevertheless has had a message routed to her be able to glean information from the header which tells her who the intended recipient is. The Net Shield secure routing system allows this flexibility.

Different people within a company may be given different components of secure information in order to allow them to extract information that they need to know from a secure communication without compromising the message itself. In this way, people (or machines) along the communication path can perform secure file management tasks without having to be given access to the message or to more of the routing information than they need to know. For example, a person whose job it is to log secure communications taking place relating to a particular project within the company may be given access to scrambled Edition AB. This scrambled edition can be XOR'ed with the SCID (after isolating it from the header) to produce the plain text Cluster I.D. Thus, the person with knowledge of the scrambled Edition AB can get cluster information and can therefore log communications pertaining to a particular project. Note that knowledge of scrambled Edition AB alone will not enable this person to derive any other information from the header, nor will it allow him to decrypt the attached message.

Likewise, a person who must keep track of secure communications being received at a workstation terminal or being sent to a printer, may be given the scrambled Edition AC. This will allow this person to acquire the plain text Device I.D. from the header. An employee keeping track of the secure communications received by a particular user may be given the scrambled Edition BC, allowing access to the plain text User I.D. Finally, a company employee keeping track of the file name, date, and time of all secure company communications can be given Edition D, allowing her to read the plain text File name date time information from the header. A person could actually be given all this information, that is, Edition D, and scrambled Editions AB, AC, and BC, and that person would still only have complete access to the secure routing system. She would not be able to generate the decrypt key and therefore would not be able to decrypt the message.

Because the secure access system can work independently of the encryption/decryption key generation process, it is contemplated that the secure access system can be used in applications outside of the Net Shield system.

All of the above file management capabilities add to the security of the system. Keeping a record of secure message transmissions and receptions in this way helps detect attempted breaches and helps indicate suspicious communications occurring within the company. The flexibility provided by the Net Shield system allows this file management to take place without allowing any one person to have more information than he needs to know.

In addition to adding to the security of the system, use of header components allows for an enhanced directory format for stored messages. Each component of the header is composed of 20 characters. The message file can be stored or archived in encrypted form according to its receiving user, access device, cleared cluster, filename, date of creation, time of creation, or any combination of these. A complex file management system can be built around these components, allowing for programs that can search archived files based on numerous categories.

Figure 10:
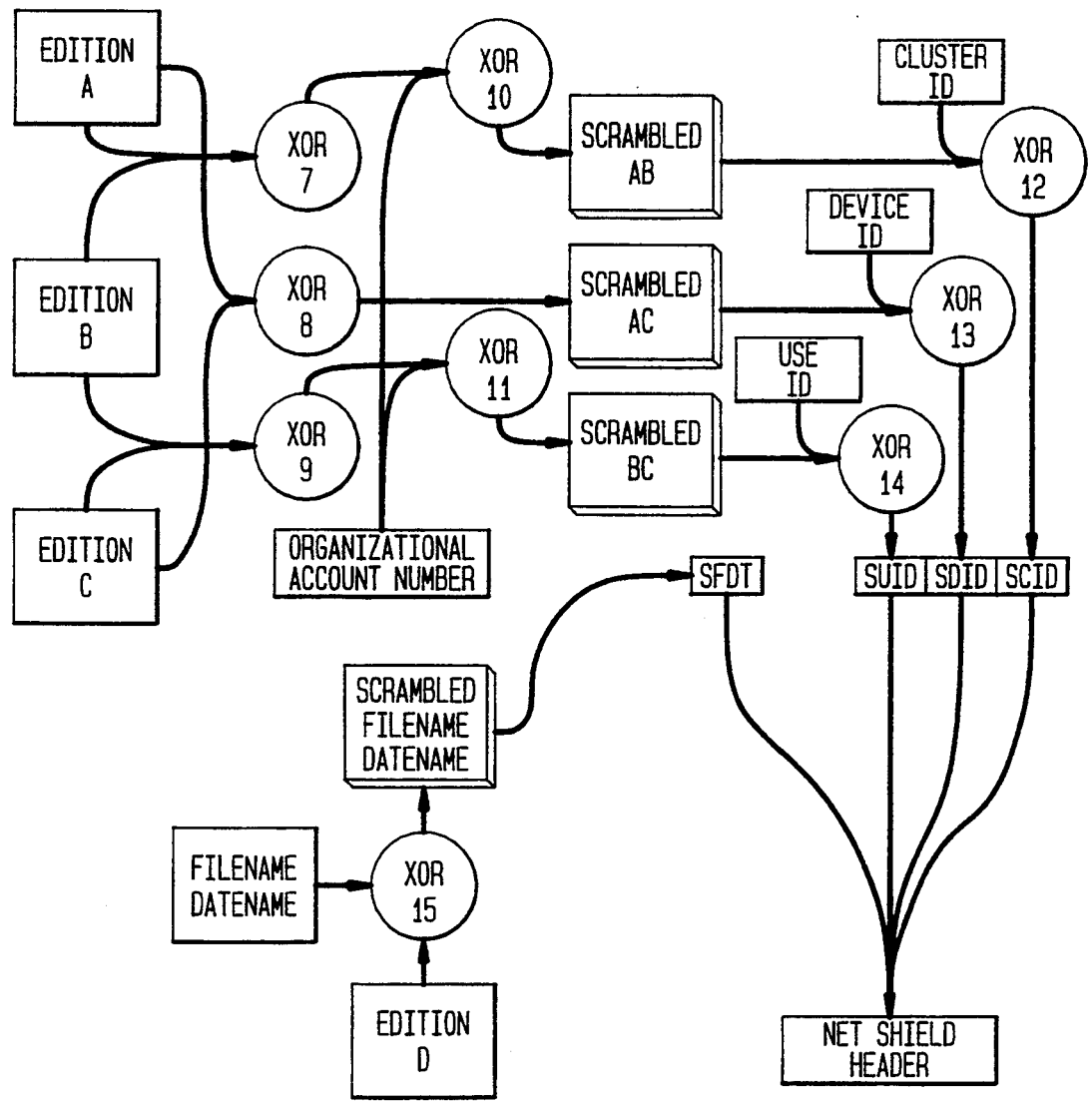

FIG. 10 shows the secure routing system header labelling function, isolated from the encryption motion. As previously stated, the secure routing function is one aspect of the overall encryption/decryption methodology. It is this function that provides the capability for composing the Net Shield header and appending it to the encrypted message. The creation of the header can be accomplished by someone who has knowledge of Edition D and scrambled Editions AB, AC, and BC only. It is not necessary for that person to have access to Editions A, B, and C. Thus, the task of creating the header for a message may be delegated to someone who does not have the full capability of encrypting the message. Also, a person may be charged with creating only part of the header; that person would only have to be given one of the scrambled editions. For example, a person working for a particular project may supply a default Cluster I.D. for headers attached to all project communications. That person need only be given the scrambled Edition AB. Likewise, someone with the responsibility of adding the filename, date, and time portion to the headers of all outgoing communications would only have to be given access to Edition D.

Once the header is created, it functions as a signature for the message. The signature can be used for archival purposes. By storing all outgoing messages according to this signature, a flexible file management system can be created. A file directory may be easily searched for a particular file by a person cleared to decode headers, or portions of headers. For example, an employee needing to acquire a list of all files transmitted on a particular day can search the directory for a header with a particular SFDT, assuming the employee has knowledge of Edition D. Thus, a secure file archival system may be created through the use of Net Shield headers.

Within the directory, additional characters may be added to the header at the discretion of the user. The additional characters may be in plain text if it is not required that this information be kept confidential.

Figure 11:
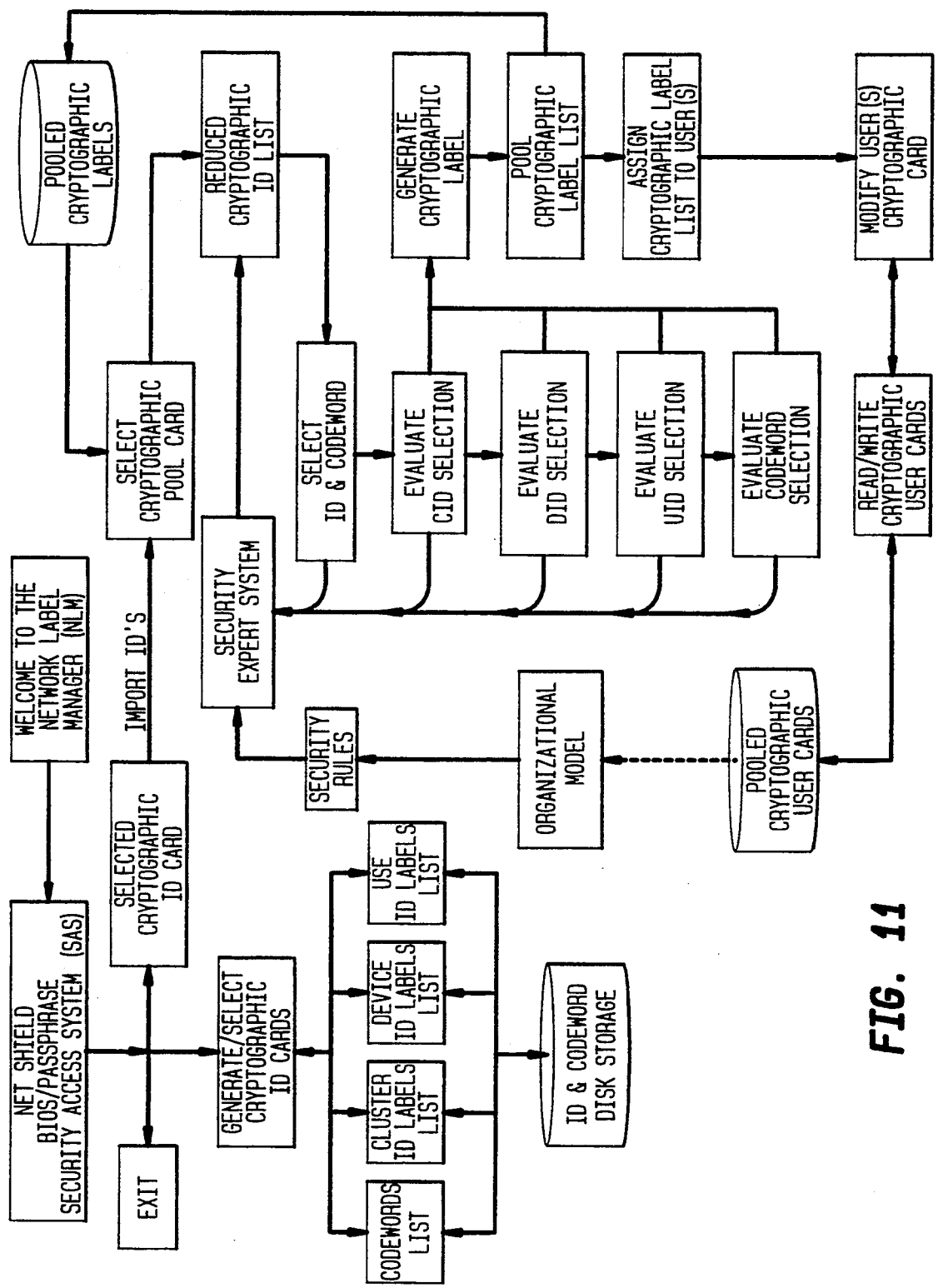

FIG. 11 shows an operational diagram of the Net Shield Network Label Manager ("NLM"). The NLM oversees the creation of labels, ensuring that combinations of labels that will go in a Net Shield header are appropriate for the system, that is, that their contribution to the encryption/decryption key will be valid. It does this by combining label components taken from component lists, rejecting invalid combinations and storing valid ones. The NLM will be used by system security managers to generate and allocate labels to individual users.

Such a management system is necessary because of the large number of labels that can possibly be generated by a company using the Net Shield. The flexibility provided by the system leads to a complexity in validation and tracking of labels. Certain combinations of label components (CID, DID, UID, etc.) will not provide a header that will allow the generation of a valid encryption/decryption key. The NLM will not allow these invalid combinations to be implemented by a user.

When first entering the NLM system, the security manager will have to satisfy the Net Shield Passphrase SAS, as any user must do before performing a Net Shield activity. The security manager is then given a chance to exit the system. If he does not choose to exit, he continues with the NLM procedure.

The first step performed in the NLM system is the generation of new cryptographic I.D. "cards". A cryptographic I.D. card is simply a list of possible words or phrases to be used to represent a particular cryptographic I.D., or label component. For example, one cryptographic I.D. card is a Use I.D. card, which would be a list of character strings that could possibly be used as a Use I.D. Such a list would be fairly easy to create; each item on the list can be the name of an employee that will be cleared to transmit or receive secure Net Shield communications. Because the Use I.D. is a character string that is 20 bytes long, each user can be identified with a good degree of specificity. For example, a Use I.D. card may look like this:

Roy D. Follendore III
John William Smith
Marie Elizabeth Jones
Lisa Eve Rosenberg Other cryptographic I.D. cards include Cluster I.D. cards, Device I.D. cards, and Code Word cards. Each of these I.D. cards consists of a list of character strings, each of 20 characters or less. Preferably, the character strings are words or phrases that make rational sense to the security manager and to other users of the system. Each cryptographic I.D. card is created independently of any other cryptographic I.D. card. These can be stored and later called up when creating labels.

The next step is to create a cryptographic pool card, which results in a reduced cryptographic I.D. list. To create the cryptographic pool card, the security manager first collects one of each kind of cryptographic I.D. card that has been created that he wishes to use to create a label. That is, he calls up a Cluster I.D. card, a Device I.D. card, a Use I.D. card, and a Code Word card. Preferably these cards can be displayed side by side on a workstation screen or computer terminal. The security manager then chooses one item from one of the cards. For example, he can choose a project name from the Cluster I.D. card, such as "WorldDomination-Study" When an item is chosen, the items in the other cards are analyzed to determine whether combinations of these items with the chosen item can result in a label that is valid for encryption and decryption.

If an item in another card can be validly combined with the chosen item, it remains in its respective card. If an item in another card cannot be validly combined with the chosen item, it drops off the screen. The item analysis and card reduction is performed by the security expert system utilized by the NLM, according to labelling rules programmed into the security expert system. Thus, the security officer knows that items left on the screen can be validly combined to create labels. The security officer may then combine remaining items to generate valid labels and may now add these to the cryptographic pool card.

If an item dropped off the screen when an item from one of the lists was selected, it cannot be combined with the, selected item. However, the security officer may find it necessary to link the ideas represented by the two items into one label. For example, an item representing a user of the Net Shield system may be incompatible with an item representing a particular project. The user may nevertheless require access to files generated by that project, and so must be linked with that project in a label. In such cases, the item that dropped off the screen must be modified slightly until it is in a form that the NLM recognizes as compatible with the selected item. The two items can then be linked into a label and can be added to the cryptographic pool card. It is still preferred that the modified item be a word or phrase that has some rational meaning to the security officer or user.

Once a set of valid labels is created, it can be stored on the system hard disk. The security officer can then assign particular labels to individual users'cryptographic I.D. cards. The user is then allowed to use labels resident on her cryptographic I.D. card when transmitting an encrypted message.

The dotted arrow between the pool cryptographic users card and the organizational model illustrates the fact that these cards can then be used as potential data and information for the organizational model which then can be used with security rules. For example, if by looking at the organizational model and looking at the cryptographic users cards regarding who can communicate to whom, and where and under what subjects, other rules external to that model can be applied which would affect the ability to produce new lists of these cards in the future. This is useful for security control issues or looking at audit trail information.

A secure network comprising secure labeling, key generation and encryption of files on the network has now been described in detail. It is to be noted, however, that this description is merely illustrative of the principles underlying the inventive concept. It is therefore contemplated that various modifications of the disclosed embodiments will, without departing from the spirit and scope of the present invention, be apparent to persons skilled in the art.

I claim:

1. A system for the secure routing of encrypted data within a communications network, comprising:

A) first digital logic means and second digital logic means, the first digital logic means being electronically linked for communication with the second digital logic means;

B) the first digital logic means comprising:
  1) a first system memory for storing data;
  2) a first access control subsystem, comprising logic for limiting system access to authorized users, the first access control subsystem being electronically connected to the first system memory for accessing data stored in the first system memory;
  3) an encryption algorithm module, comprising logic for converting plain text messages into encrypted text messages, the encryption algorithm module being electronically connected to the first system memory for accessing data stored in the first system memory and the encryption algorithm module being further electronically connected to the first access control subsystem to accept inputs from the first access control subsystem;
  4) a message header labelling subsystem, comprising logic for limiting system access, subject to label conditions, the message header labelling subsystem being electronically connected to the first system memory for accessing data stored in the first system memory and the message header labelling subsystem being further electronically connected to the encryption algorithm module to accept inputs from the encryption algorithm module; and
  5) message transmission means for transmitting data to the second digit logic means;

C) the second digital logic means comprising:
  1) a second system memory for storing data;
  2) a second access control subsystem, comprising logic for limiting system access to authorized users, the second access control subsystem being electronically connected to the second system memory for accessing data stored in the second system memory;
  3) a decryption algorithm module, comprising logic for converting encrypted text messages into plain text messages, the decryption algorithm module being electronically connected to the second system memory for accessing data stored in the second system memory and the decryption algorithm module being further electronically connected to the second access control subsystem to accept inputs from the second access control subsystem;
  4) a message header identification subsystem, comprising logic for limiting system access, subject to label conditions, the message header identification subsystem being electronically connected to the second system memory for accessing data stored in the second system memory and the message header identification subsystem being further electronically connected to the decryption algorithm module to accept inputs from the decryption algorithm module; and
  5) receiver means for receiving data transmitted by the first digital logic means;

D) the encryption algorithm module working in conjunction with the message header labelling subsystem to create an outgoing message transmitted from the transmission means of the first digital logic means to the receiver means of the second digital logic means;

E) the message header identification subsystem limiting access to an incoming message prior to conversion of a received encrypted text message into a plain text message by the decryption algorithm module by providing a cryptographic key to the encryption algorithm module;

F) the first access control subsystem and the second access control subsystem being adapted to manipulate passphrase information entered by users to generate a passkey;

G) the first access control subsystem further comprising a check key which is compared to the passkey;

H) the passkey being an input to the encryption algorithm module which allows editions of cryptographic information stored within the first system memory to be inputs to the encryption algorithm module only if the passkey exactly matches the check key;

I) the second access control subsystem further comprising a check key which is compared to the passkey;

J) the passkey being an input to the decryption algorithm module which allows editions of cryptographic information stored within the second system memory to be inputs to the decryption algorithm module only if the passkey exactly matches the check key;

K) the passkey inputs to the encryption algorithm module allowing the encryption algorithm module to convert a plain text message to an encrypted text message;

L) the passkey inputs to the decryption algorithm module allowing the decryption algorithm module to convert an encrypted text message to a plain text message;

M) the first digital logic means being adapted to exclusive OR all possible pairings of the editions of cryptographic information and an organizational account number to generate scrambled editions of cryptographic information;

N) the first digital logic means being further adapted to exclusive OR the scrambled editions of cryptographic information with label conditions to generate scrambled label conditions; and O) the first digital logic means being further adapted to manipulate the scrambled label conditions and the editions of cryptographic data to generate an encryption key for allowing the encryption algorithm module to convert a plain text message to an encrypted text message.

2. The system of claim 1, wherein the passphrase information entered by a user comprises alphanumeric characters.

3. The system of claim 2, wherein the system converts the alphanumeric characters input by the user to digital data.

4. The system of claim 1, wherein the first access control subsystem manipulates the passphrase information with BIOS information stored in the first system memory and the second access control subsystem manipulates the passphrase information with BIOS information stored in the second system memory.

5. The system of claim 4, wherein the BIOS information includes the date of origin of the BIOS information.

6. The system of claim 5, wherein a system serial number, stored in the first system memory and in the second system memory, is manipulated with the passphrase information and the BIOS information to generate the passkey.

7. The system of claim 1, wherein the first digital logic means is adapted to manipulate filename/date/time information stored in the first system memory with one edition of cryptographic information to generate scrambled filename/date/time information.

8. The system of claim 7, wherein the first digital logic means is adapted to manipulate the scrambled filename/date/time information with the scrambled label conditions and the editions of cryptographic information to generate the encryption key for allowing the encryption algorithm module to convert a plain text message into an encrypted text message.

9. The system of claim 1, wherein the header labelling subsystem is adapted to combine the scrambled label conditions to form a message header.

10. The system of claim 9, wherein the message header further comprises the scrambled filename/date/time information.

11. The system of claim 10, wherein the message header further comprises a code word.

12. The system of claim 9, 10, or 11, wherein the first digital logic means is adapted to append the encrypted text message to the message header prior to transmission.

13. The system of claim 1, wherein the header identification subsystem is adapted to separate a message header from the encrypted text message and into separate scrambled label conditions.

14. The system of claim 13, wherein the header identification subsystem is further adapted to separate scrambled filename/date/time information from the message header.

15. The system of claim 14, wherein the header identification subsystem is further adapted to separate a code word from the message header.

16. The system of claim 15, wherein:

A) the second digital logic means is adapted to generate scrambled editions by manipulating the editions of cryptographic information;

B) the second digital logic means is adapted to recapture label conditions by manipulating the scrambled editions with scrambled label conditions;

C) the second digital logic means is adapted to manipulate the scrambled label conditions and the editions of cryptographic data to generate a decryption key for allowing the decryption algorithm module to convert an encrypted text message into a plain text message.

17. The system of claim 16, further comprising an organizational account number stored in the second system memory, the second digital logic means being adapted to manipulate the organizational account number with the editions of cryptographic data to generate the scrambled editions.

18. The system of claim 17, wherein the second digital logic means is adapted to recapture the filename/date/time information by manipulating the scrambled filename/date/time information with one edition of cryptographic information.

19. The system of claim 11, wherein the second digital logic means is adapted to manipulate the scrambled filename/date/time information with the scrambled label conditions and the editions of encryption information to generate the decryption key for allowing the decryption algorithm module to convert an encrypted text message into a plain text message.

20. A method for the secure routing of data in a communications system, comprising the following steps performed in the order given:

A) limiting access to the communications system to an authorized sending user at a transmit port;

B) retrieving and converting a plain text message to an encrypted text message according to the following substeps:

1) reading a plain text message file from communications system memory;

2) modulo-2 adding all possible pairings of the editions of cryptographic information and an organizational account number stored in communications system memory by digital logic means to generate scrambled editions of cryptographic information;

3) modulo-2 adding the scrambled editions of cryptographic information with message access conditions to generate scrambled access conditions;

4) modulo-2 adding filename/date/time information stored in communications system memory with one edition of cryptogphic information to generate scrambled filename/date/time information;

5) modulo-2 adding the scrambled filename/date/time information with the scrambled access conditions and the editions of cryptographic information to generate an encryption key;

6) applying the encryption key to the encryption means;

7) converting the plain text message to an encrypted text message by applying the encryption means to the plain text message; and 8) applying the encrypted text message to a header labeling subsystem located within the communications system;

C) creating a message header which specifies message access conditions and is a key to the encryption means;

D) adding the message header to the front of the encrypted text message to create the secure message;

E) transmitting the secure message from the transmit port to a receive port via the communications system;

F) limiting access to the communications system to an authorized receiving user at a receive port;

G) stripping the message header from the secure message;

H) decoding the message header to recover the message access conditions and encryption means key; and I) converting the encrypted text message to a plain text message.

21. The method of claim 20, wherein the step of limiting access to the communications system to an authorized sending user at a transmit port comprises the substeps of:

A) initializing the contents of an attempt counter located in the communications system to zero;

B) having the sending user enter passphrase information into the transmit port;

C) manipulating the passphrase information with BIOS information and a serial number stored in the communications system using digital logic means, in order to generate a passkey;

D) comparing the passkey to a check key stored in the communications system;

E) applying the passkey to a communication systems encryption means if the passkey matches the check key exactly; and F) copying a file containing editions of cryptographic information, stored in the communications system, into the encryption means.

22. The method of claim 21, wherein the following steps occur if the passkey does not match the check key exactly:

A) incrementing the attempt counter by one;

B) refusing access by the sending user to the communication system if the contents of the attempt counter equals three;

C) having the sending user enter passphrase information into the transmit port;

D) manipulating the passphrase information with BIOS information and a serial number stored in the communications system using digital logic means, in order to generate a passkey;

E) comparing the passkey to a check key stored in the communications system;

F) repeating steps B) through E) if the passkey does not exactly match the check key;

G) applying the passkey to a communication systems encryption means if the passkey matches the check key exactly; and H) copying a file containing editions of cryptographic information, stored in the communications system, into the encryption means.

23. The method of claim 20 wherein the step of creating a message header which specifies message access conditions comprises the substeps of:

A) combining the scrambled filename/date/time information with the scrambled access conditions to form the scrambled cluster/device/user/filename/date/time header; and B) appending a code word to the scrambled cluster/device/user/filename/date/time header to form the message header.

24. The method of claim 20, wherein the step of limiting access to the communications system to an authorized receiving user at a receive port comprises the substeps of:

A) initializing the contents of an attempt counter located in the communications system to zero;

B) having the receiving user enter passphrase information into the receive port;

C) manipulating the passphrase information with BIOS information and a serial number stored in the communications system using digital logic means, in order to generate a passkey;

D) comparing the passkey to a check key stored in the communications system;

E) applying the passkey to a communications system decryption means if the passkey matches the check key exactly; and F) copying a file containing editions of cryptographic information, stored in the communications system, into the decryption means.

25. The method of claim 24, wherein the following steps occur if the passkey does not match the check key exactly:

A) incrementing the attempt counter by one;

B) refusing access by the receiving user to the communications system if the contents of the attempt counter equals three;

C) having the receiving user enter passphrase information into the receive port;

D) manipulating the passphrase information with BIOS information and a serial number stored in the communications system using digital logic means, in order to generate a passkey;

E) comparing the passkey to a check key stored in the communications system;

F) repeating steps B) through E) if the passkey does not exactly match the check key;

G) applying the passkey to a communication systems decryption means if the passkey matches the check key exactly; and H) copying a file containing editions of cryptographic information, stored in the communications system, into the decryption means.

26. The method of claim 20 wherein the step of stripping the message header from the secure message comprises the substeps of:

A) separating the message header from the encrypted data message;

B) dividing the message header into the code word and the cluster/device/user/filename/date/time header; and C) dividing the cluster/device/user/filename/date/time header into the filename/date/time information and the scrambled access conditions.

27. The method of claim 20 wherein the step of decoding the message header to recover the message access conditions comprises the substeps of:

A) manipulating the editions of cryptographic information with the organizational account number located in communications system memory to generate scrambled editions of cryptographic information; and P1 B) manipulating the scrambled editions of cryptographic information with scrambled access conditions to recapture the access conditions.

28. The method of claim 27 wherein the step of converting the encrypted text message to a plain text message comprises the substeps of:

A) manipulating the scrambled filename/date/time information with one edition of cryptographic information to recapture the filename/date/time information;

B) manipulating the scrambled access conditions with the scrambled filename/date/time information and the editions of cryptographic information to generate a decryption key;

C) applying the decryption key to a communications system decryption means; and

D) converting the encrypted text message to a plain text message by applying the decryption means to the encrypted text message.

* * * * *